April 9, 1963 W. A. HANSON ETAL 3,084,519
TWO TEMPERATURE FORCED AIR REFRIGERATOR SYSTEMS
Filed March 6, 1958 7 Sheets-Sheet 1

INVENTORS
Warren A. Hanson
Donald F. Swanson
Wynn G. Winkler
BY
ATTORNEY

INVENTORS
Warren A. Hanson
Donald F. Swanson
Wynn G. Winkler
BY Robert M. Dunning
ATTORNEY April 9, 1963  W. A. HANSON ETAL  3,084,519
TWO TEMPERATURE FORCED AIR REFRIGERATOR SYSTEMS
Filed March 6, 1958  7 Sheets-Sheet 3

INVENTORS
Warren A. Hanson
Donald F. Swanson
BY Wynn G. Winkler
ATTORNEY

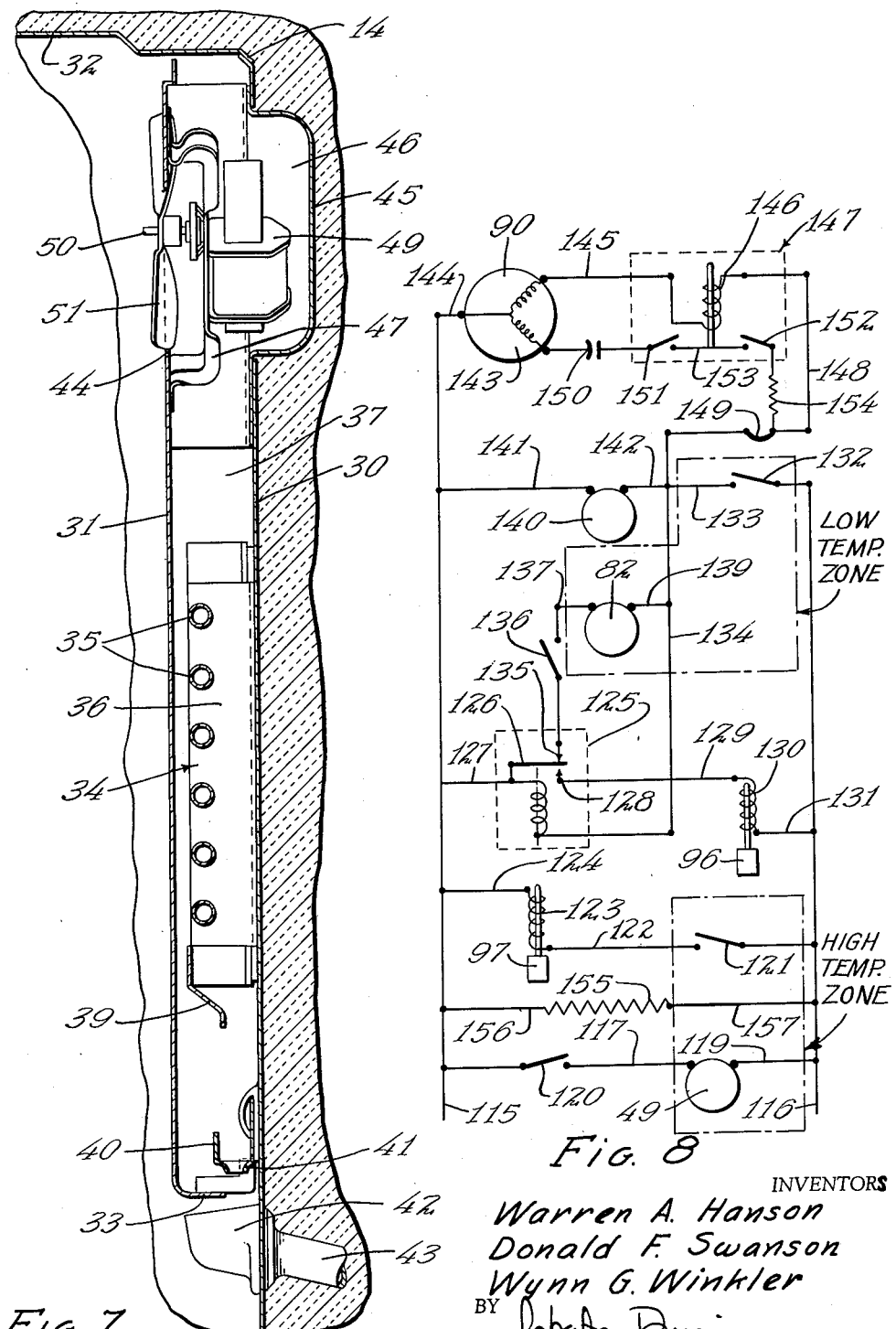

INVENTORS
Warren A. Hanson
Donald F. Swanson
Wynn G. Winkler
BY Robert M. Dunning
ATTORNEY

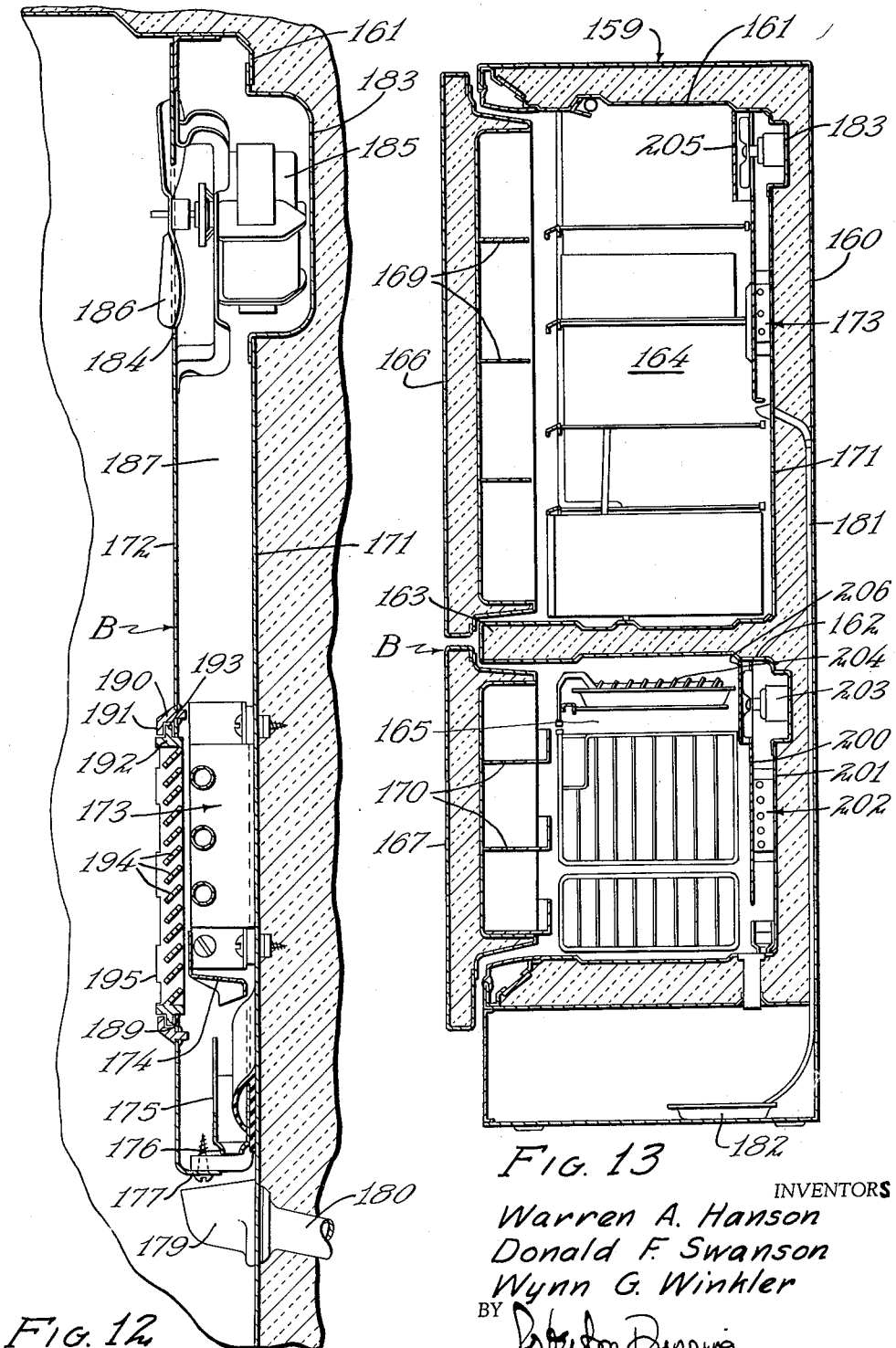

United States Patent Office 3,084,519
Patented Apr. 9, 1963

3,084,519
TWO TEMPERATURE FORCED AIR
REFRIGERATOR SYSTEMS
Warren A. Hanson, Wynn G. Winkler, and Donald F. Swanson, St. Paul, Minn., assignors to Whirlpool Corporation, St. Joseph, Mich., a corporation of Delaware
Filed Mar. 6, 1958, Ser. No. 719,611
13 Claims. (Cl. 62—155)

This invention relates to an improvement in two temperature forced air refrigeration systems and deals particularly with an efficient and effective refrigerator capable of maintaining products above a freezing temperature in one zone and below a freezing temperature in other zones.

An object of the present invention lies in the provision of a refrigerator and freezer combination including essentially two separate systems operated by a single compressor and each of which is fed independently according to its requirements, permitting a constant differential between freezer and refrigerator temperatures regardless of ambient temperature. This system thus differs from most systems employing a single compressor wherein the lowering of the temperature in one zone has a tendency to corresponding lower the temperature in the other zone.

A feature of the present invention lies in the provision of a refrigerator and freezer combination which permits faster cooling of the product load than is usually obtainable. Means is provided in each of the zones for circulating air over the evaporator coils and distributing the air to all parts of the cabinet so that all of the products placed therein are quickly and evenly cooled.

A further feature of the present invention lies in drawing air in the freezing compartment over the evaporator coils and circulating the cooled air across the top of the freezing compartment so as to more thoroughly and quickly freeze products stored therein.

A further feature of the present invention lies in the provision of a refrigerator compartment including an inner compartment for meat and similar products which may be maintained at a slightly lower temperature than other products in the same compartment while at the same time circulating air through the entire cabinet. Means is provided for circulating air over the evaporator coils and deflecting a part of this air directly after passing through the coils through a shroud enclosing a receptacle in which meat or similar products may be stored. As a result, the cooled air passes along the walls of the receptacle while the air is at its lowest temperature, thus cooling the receptacle to a somewhat lower temperature than other products in the same compartment.

A further feature of the present invention resides in the provision of a refrigerator freezer combination which will automatically defrost at desired intervals. Means is provided in each of the compartments for collecting moisture resulting from the defrosting of the evaporator coils and conducting this moisture to a water collection pan or other drain.

An added feature of the present invention resides in the provision of a two temperature refrigeration system which includes a first circuit embodying the compressor, a condenser, a first capillary tube or other flow restricting device, a low temperature evaporator coil, and a suction return line to the compressor. The system also involves a second refrigerant system which includes the same compressor and condenser, a second capillary tube or other flow restricting device, a higher temperature evaporator coil, and a connection to the inlet end of the lower temperature refrigerant coil through which the refrigerant flows to the same return suction line. The second refrigerant system is controlled by a valve capable of directing the refrigerant flow to the second capillary tube. The valve is preferably controlled by a thermostatic element in the refrigerator compartment to circulate the refrigerant through the higher temperature evaporator coil only when the temperature in this compartment rises above a certain predetermined maximum.

A further feature of the present invention resides in the provision of a hot refrigerant gas line bypassing the condenser and the first capillary tube and connected to the inlet end of the lower temperature evaporator to quickly heat this lower temperature evaporator above the freezing temperature and to melt the ice collected thereupon. The hot gas line is controlled by a suitable electrically operated valve which in preferred form is actuated at preset intervals by a suitable timer.

A further feature of the present invention resides in the provision of a refrigerant system of the type described having a drip pan positioned beneath the lower temperature refrigerator and in directing the hot gas line in heat exchange relation to this drip pan to heat the same above the freezing temperature during the defrosting operation.

These and other objects and novel features of the invention will be more clearly and fully set forth in the following specification and claims.

In the drawings forming a part of the specification:

FIGURE 7 is an enlarged sectional view through the refrigerator or higher temperature evaporator and a portion of the air circulating apparatus.

FIGURE 8 is a diagrammatic view of the wiring of the refrigerator and freezer combination.

FIGURE 12 is a cross sectional view through the refrigerator or high temperature evaporator and through a portion of the air circulation system of the modified cabinet of FIGURE 10.

FIGURE 13 is a vertical sectional view through the cabinet of the combined refrigerator and freezer shown in FIGURES 10 through 12.

Figure 1:
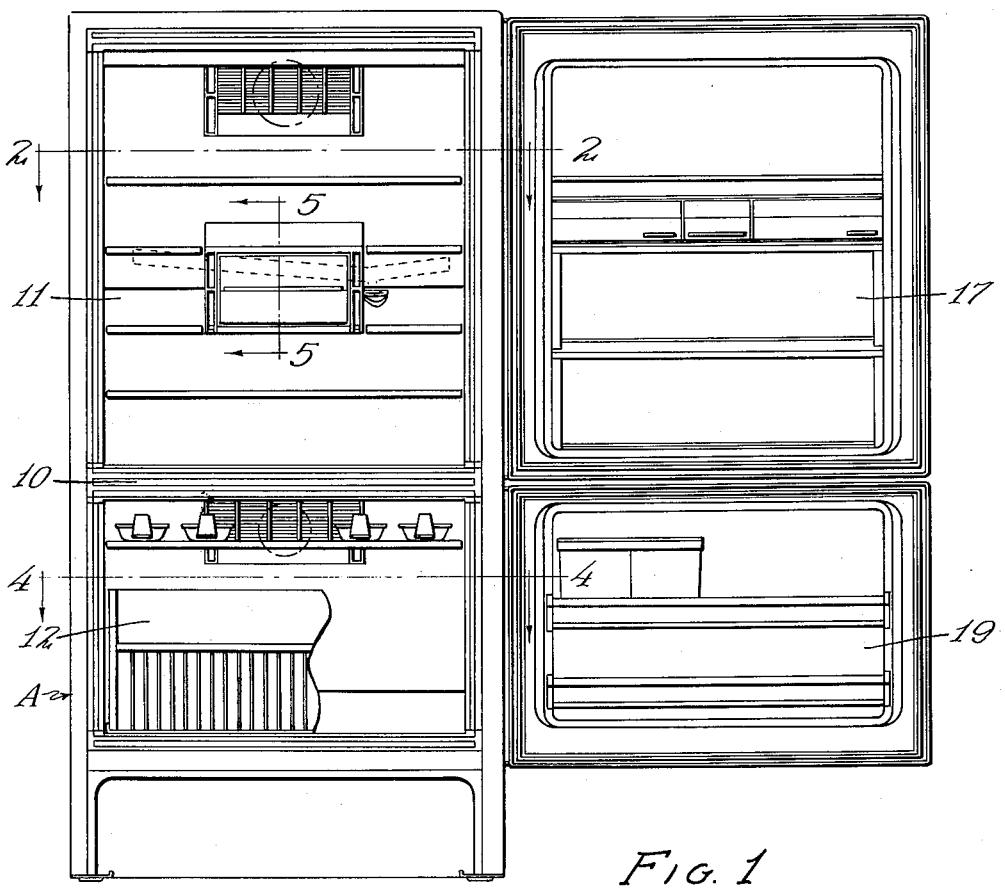
FIGURE 1 is a front elevational view of a combination freezer and refrigerator showing the general arrangement of parts therein.
Figure 2:
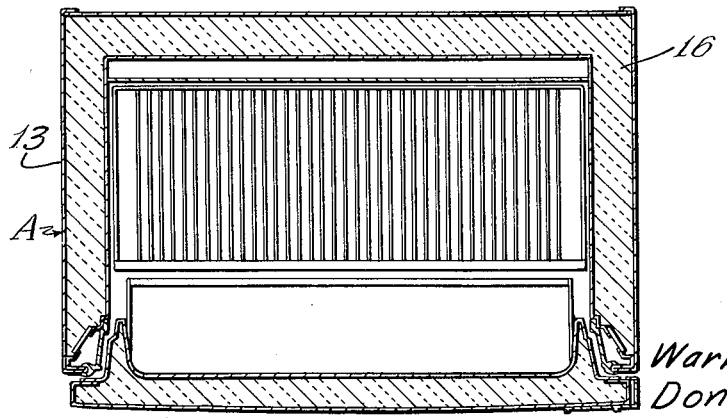
FIG. 2 is a cross sectional view on a horizontal plane through the refrigerator, the position of the section being indicated by the line 2—2 of FIGURE 1.

The refrigerator A illustrated in FIGURES 1 through 9 of the drawings includes a generally rectangular cabinet which is divided by a central horizontal partition 10 into an upper refrigeration compartment 11 and a lower freezer compartment 12. In general, the cabinet is provided with an outer metallic shell 13 which encloses the inner upper liner 14 and the inner lower liner 15, on opposite sides of the partition 10. Insulation 16 is provided between the inner and outer shells in the usual manner. An upper door 17 normally closes the refrigeration compartment 11 and a lower door 19 closes the lower freezer compartment 12. Thus each of the compartments may be individually opened.

The inner surface of the door 17 is hollow in form as indicated at 20 and forms a support for a transverse shelf 21, a storage compartment 22, and a pair of detachable containers 23 and 24. The lower door 19 is also hollowed as indicated at 25 and acts to support shelves 26 and 27 which may be used to support receptacles 29 containing packages of frozen goods and the like.

With reference now to FIGURE 7 of the drawings, the rear wall of the cabinet liner 14 of the refrigeration compartment 11 is indicated at 30 and a baffle 31 is supported in spaced relation thereto. This baffle 31 extends from a point adjacent to the upper wall 32 of the liner 14 and terminates at its lower edge with an inturned flange 33 approximately one-third to one-half the height of the liner 14 from the lower end thereof. An evaporator assembly 34 including a series of connected coils 35 held in spaced relation by heat transfer fins 36 is supported in the space 37 between the baffle 31 and the rear liner wall 30. A deflecting plate 39 is provided at the lower end of the evaporator assembly to deflect moisture draining from the evaporator assembly 34 during the defrosting operation toward the rear wall 30. A water collecting trough or drip trough 40 is secured to the rear liner wall 30 beneath the deflector 39 to catch moisture therefrom. The drip trough 40 is provided with an outlet 41 which directs the moisture between the rear edge of the flange 33 and the wall 30 into an open top fitting 42 which extends through the lining wall 30 for connection with a drain pipe 43.

The baffle 31 is provided with a circular aperture 44 therethrough near the upper end of the baffle. The liner wall 30 is provided with an outwardly projecting dome 45 which forms a generally cylindrical cavity 46 inwardly of the opening 44. Suitable bracket means 47 supports an electric fan driven by the fan motor 49, the shaft 50 of the fan motor being concentric with the opening 44 and being equipped with a blade 51 capable of drawing air inwardly and circulating the air downwardly through the space 37 between the rear wall 30 and the baffle 31 and past the evaporator assembly 34 to be cooled by contact therewith. The cooled air flows through the space between the rearwardly turned flange 33 and the liner rear wall 30.

Figure 5:
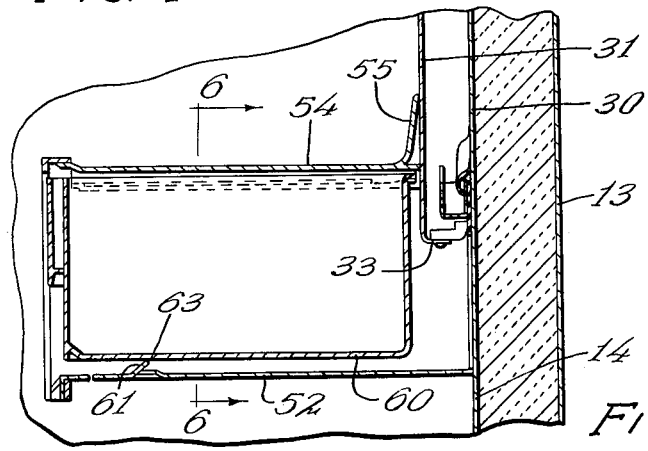
FIGURE 5 is an enlarged sectional view through the refrigerator meat pan, the position of the section being indicated by the line 5—5 of FIGURE 1.
Figure 6:
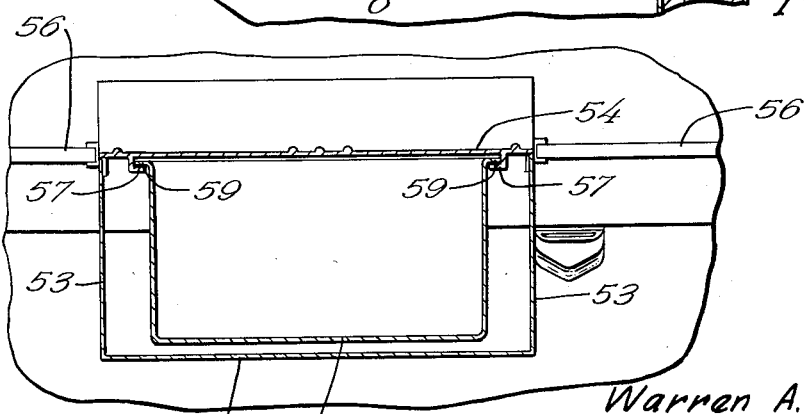
FIGURE 6 is a cross sectional view through the meat pan and enclosing shroud, the position of the section being indicated by the line 6—6 of FIGURE 5.

With reference now to FIGURE 5 of the drawings, it will be noted that a shelf 52 extends across the central part of the rear wall 30 beneath the lower end of the baffle 31 which forms a first passageway with the wall 30. This shelf 52 forms the bottom wall of a shroud which also includes spaced side walls 53 and a top panel 54. The lower ends of the side walls 53 extend to the rear wall 30 while the upper portions of these walls fit against the baffle 31. The panel or shelf 54 is provided with an upwardly turned flange 55 which fits snugly against the baffle 31 at its upper edge. The walls 52, 53 and 54 form a generally rectangular shroud or second passageway which is supported between a pair of shelves 56 and through which a part of the air circulated by the fan 49 is directed.

The under surface of the top panel 54 is provided with a pair of channel shaped guides or tracks 57 which slidably support the outturned flanges 59 of an article supporting means here shown as a meat pan 60. A flange 61 is bent upwardly and rearwardly from the bottom panel or shelf 52, this flange 61 extending the major portion of the width of the panel 52 and forming an opening beneath the flange 61. The upper and rearward edge 63 of the flange 61 is closely adjacent to the bottom of the pan 60. As a result, air which is deflected between the bottom of the pan 60 and the upper surface of the panel 52 is directed downwardly through the opening by the flange 61.

The purpose of this arrangement is to provide a receptacle directly in the path of air which has been cooled to its lowest temperature and directly after the air passes through the evaporator assembly 34. As a result, the air being circulated wipes along the bottom and side walls of the pan 60 and maintains this pan at a somewhat lower temperature than receptacles located in other parts of the same refrigerator compartment.

Figure 3:
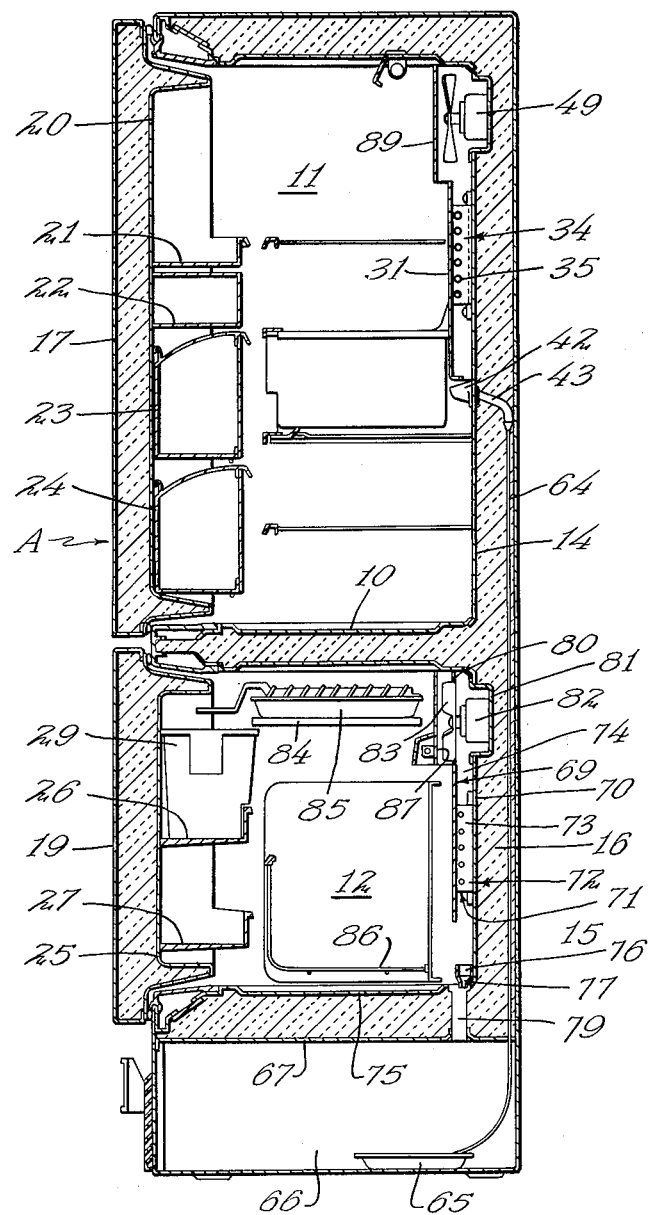
FIGURE 3 is a vertical sectional view through the refrigerator showing the relationship of parts therein.

With reference now to FIGURE 3 of the drawings, it will be noted that the drain 43 is connected by a tubular connection 64 to a water collecting pan 65 mounted in a storage compartment 66 beneath the lower wall 67 of the refrigerator and freezer cabinet body. The water in the pan is evaporated by the heat generated in the compressor compartment. In the particular arrangement illustrated the compartment 66 acts to contain the compressor and other parts of the refrigeration unit. These elements have been omitted from FIGURE 3 of the drawings to simplify the illustration.

A baffle 69 is supported in spaced relation to the rear wall 70 of the liner 15 of the freezing compartment 12. An evaporator assembly 71 including a series of spaced connected coils 72 held in proper relation by cooling fins 73 is positioned in the space 74 between the baffle 69 and the rear wall 70. The baffle 69 terminates well above the level of the bottom panel 75 of the freezer compartment to permit air to enter the space 74. A drip trough 76 is positioned on the rear wall 70 near the bottom wall 75 beneath the evaporator assembly 71 to catch moisture draining therefrom during the defrosting operation. The drip trough 76 is provided with an outlet 77 which communicates with a drain passage 79 through the bottom liner wall 75, and through the bottom panel 67 of the refrigerator cabinet. This drain passage 79 terminates above the water collection pan 65 to receive the water therefrom.

The baffle 69 is provided with a circular aperture 80 therethrough near the upper end of the baffle. The rear liner wall 70 is provided with a dome shaped outward projection 81 forming a generally cylindrical recess in the rear wall of the compartment 12. A fan driven by a fan motor 82 is supported within the cylindrical recess and supports a fan blade 83 which is designed to draw air upwardly over the evaporator coils 72 and to discharge the air across the top of the freezer compartment 12. A shelf 84 is supported forwardly of the fan and its motor 82 and ice cube trays 85 may be supported on the shelf 84 directly in the path of air being cooled by the evaporator coils.

It will be noted that air at its coldest temperature is circulated across the top of the compartment 12 where by natural circulation as well as by the action of the fan motor 82 it will tend to move downwardly into the various receptacles supported within the freezer compartment. A removable basket 86 is provided within the compartment 12 to contain packages of goods to be frozen or to be maintained in a frozen condition.

Figure 9:
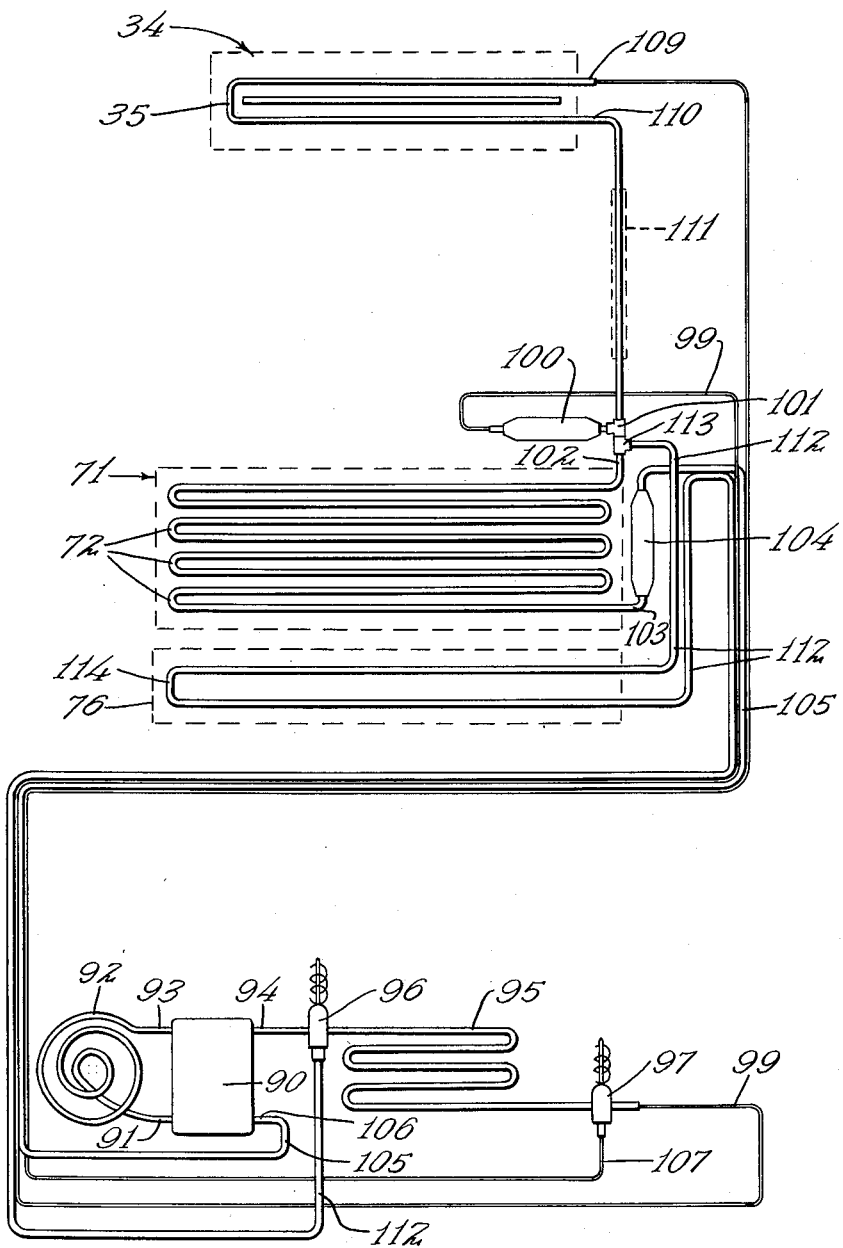
FIGURE 9 is a diagrammatic view of the refrigerant system used in the refrigerator freezer combination.
Figure 10:
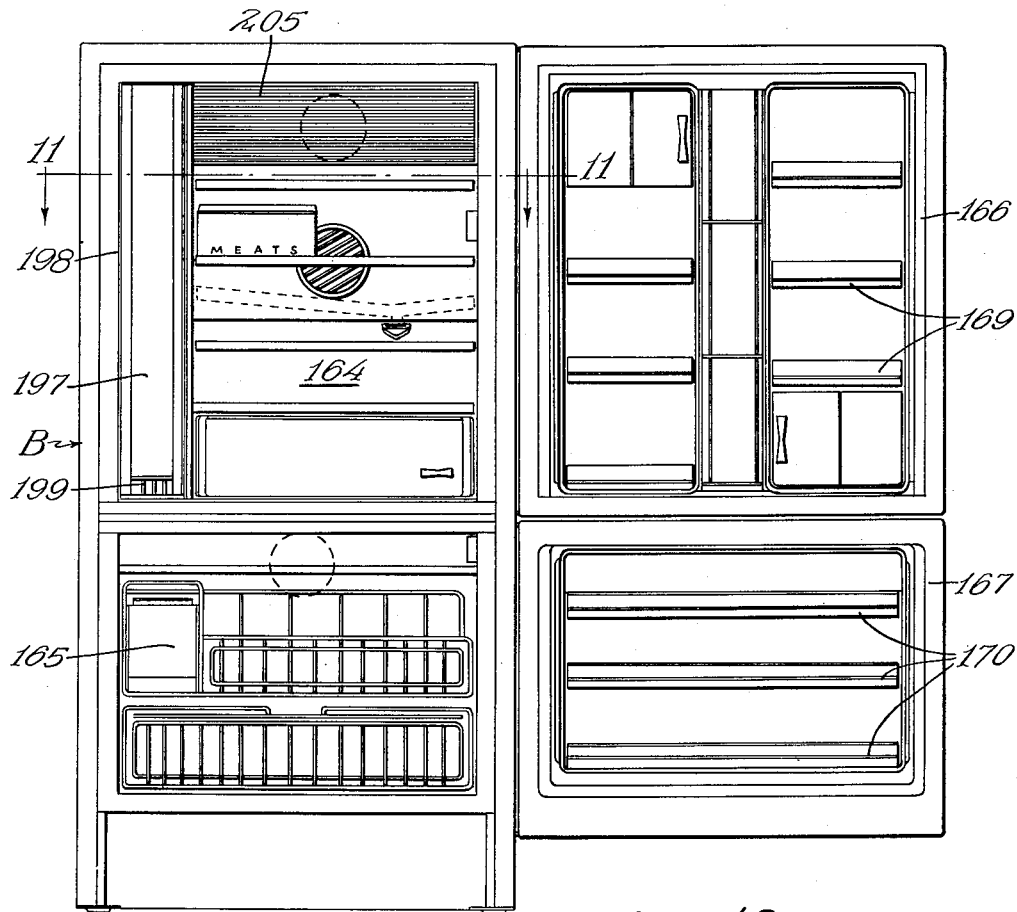
FIGURE 10 is a front elevational view similar to FIGURE 1 and showing a modified form of refrigerator cabinet design embodying a similar refrigerant system.
Figure 11:
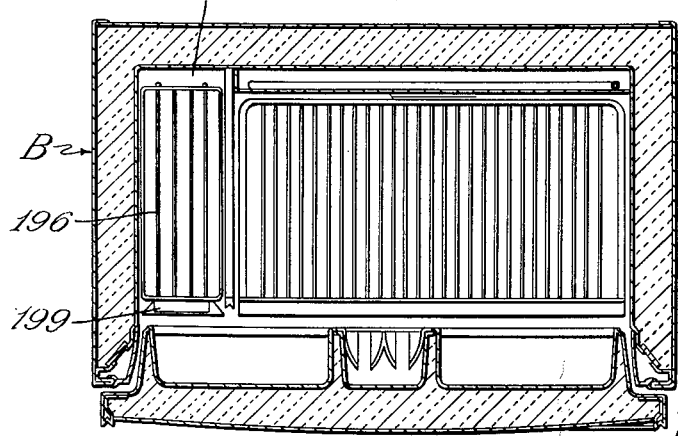
FIGURE 11 is a horizontal sectional view through the refrigeration portion of the apparatus, the position of the section being indicated by the line 11—11 of FIGURE 10.

The fan blade 83 is normally concealed by a louvered grill 87 which is mounted forwardly of the fan and through which the air must flow. A similar grill 89 is supported forwardly of the fan 49 in the refrigeration compartment 11. With reference now to FIGURE 9 of the drawing, the refrigerant system includes a single compressor 90 having an outlet 91 connected to a precooler 92 which then introduces the refrigerant into the compressor dome at 93 and from the compressor dome at 94. The dome outlet 94 is connected to the condenser 95 across a normally closed solenoid operated two way valve 96. From the condenser 95, the refrigerant flows to a first flow restrictor or capillary tube 99. This capillary tube 99 extends in heat exchange relation to the refrigerator suction line which will be later described which directs the refrigerant through a dryer 100 and through a T connection 101 connected to the inlet end 102 of the evaporator coils 72 forming a part of the freezer evaporator assembly 71. The outlet 103 of the evaporator coils 72 is connected through an accumulator 104 to the suction return line 105 connected to the compressor inlet 106. Thus in ordinary operation utilizing only the freezer evaporator with solenoid 96 in its normally closed position, the refrigerant is cooled by the precooler 92 and condenser 95 and is forced through the flow restrictor 99 into the freezer evaporator coils 72 and is returned through the suction line 105 to the compressor 90 to complete the circuit.

A second refrigeration two way circuit is controlled by the valve 97. When this solenoid valve 97 is energized, opened, the refrigerant leaving the condenser 95 is directed through a second capillary tube 107 which also extends in heat exchange relation to the suction line 105 to the inlet end 109 of the evaporator coil 35 of the refrigerator evaporator 34. The outlet of the coil 35, identified as 110, extends through the insulated connection 111 to the T connection 101 at the inlet 102 of the freezer coils 72. Accordingly, the refrigerant leaving the refrigerator evaporator 35 then flows through the freezer evaporator coils 72 before passing through the accumulator 104 and the suction line 105 to the compressor inlet 106 thus completing the circuit.

The two way solenoid valve 96 controls a hot gas line 112 which leads from the valve 96 to a T connection 113 at the inlet 102 of the freezer evaporator coil 72. Thus, when the solenoid valve 96 is energized or opened, the hot refrigerant gas is directed to the freezer evaporator coil 72 thus defrosting these coils. It should be noted that the hot gas line 112 includes a loop 114 which is in heat exchange relation to the drip trough 76 in the freezer compartment 12. Thus, during the defrosting operation, the drip trough is heated above the melting point so that the water draining from the evaporator coil will not freeze upon contact with the cold surface of this drip trough. As the coil 114 is between the valve 96 and the evaporator coils 72, the drip trough will be heated to a slightly higher temperature than the evaporator coils thus insuring the drainage of all of the water at the completion of the defrosting operation.

The refrigerator control is illustrated in the wiring diagram of FIGURE 8. The line wires 115 and 116 are connected by conductors 117 and 119 to the motor of the fan 49. The conductor 117 includes a door actuated switch 120 which opens the circuit to the air circulating fan motor 49 when the upper refrigerator door 17 is opened. The circuit to the solenoid valve 97 is controlled by a thermostatic switch 121 which is connected to the line wire 116 and connected by conductor 122 to one terminal of the solenoid coil 123 of the valve 97, the other terminal of which is connected by conductor 124 to the line wire 115. The thermostatic switch 121 is located in the refrigerator compartment 11 and when this compartment calls for refrigeration due to an elevation in temperature, the solenoid valve 97 is energized thus opening the second refrigerant circuit which leads through the refrigerator evaporator coils 35 and the freezer evaporator coils 72 in series. Because of the fact that between cycles of operation no refrigerant flows through the refrigerator evaporator coil 35, the temperature of this coil is permitted to rise above the freezing temperature by means of a constant cut-in control set above freezing, thus providing a periodic cycle defrost for the coils 35.

A timer clock 125 controls a single pole double throw switch 126 which controls a circuit from line wire 115 through conductor 127, switch blade 126, normally open contact 128, conductor 129 to the solenoid coil 130 of the valve 96, the other coil terminal being connected by conductor 131 to line wire 116. The circuit to the defrosting clock 125 extends through the thermostatic switch 132 located in the freezer compartment 12 and extends from the line wire 116, through the switch 132, and through conductors 133 and 134 to one side of the timer motor, the other terminal of which is connected by conductor 127 to line wire 115. Thus, the period between defrosting operations is dependent upon the frequency of operation and length of operation of the compressor The operation of the motor and the fan motor 82 is also controlled by the thermostatic switch 132 and thus the fan motor 82 only operates when the compressor operates.

With the arrangement of FIGURE 8, the timer 125 closes a timer first switch 126—128 to defrost the evaporator in the low temperature zone by opening the valve 96. At the same time, a second switch 126—135 of the timer 125 is opened to stop the fan motor and prevent air in the low temperature zone being circulated in the heated evaporator.

The fan driven by a fan motor 82 is normally in operation when the thermostatic switch 132 is closed and when the freezer door is closed. When the defrosting clock 125 is not calling for defrost, the switch blade 126 engages the normally closed contact 135 which is connected to one terminal of the freezer door switch 136. The other terminal of the normally closed door switch 136 is connected to one terminal of the fan motor 82 by conductor 137. The other terminal of the fan motor is connected by conductor 139 to conductor 134 leading through the thermostatic switch 132 to line wire 116.

Thus at all times when the defrosting timer clock is not calling for a defrosting cycle, a circuit is closed from line wire 115 to the fan motor 82 through the freezer door switch 136 and the thermostatic switch 132 to the line wire 116, to continuously circulate air during periods when the compressor 90 is in operation and the freezer door is closed.

The condenser fan motor 140 is also controlled by the thermostatic switch 132. When the switch 132 is closed, a circuit is closed from line wire 115 through conductor 141, the fan motor 140, and conductor 142 to conductor 133 leading to the line wire 116 through the switch 132. Thus, the condenser fan operates at all times when the compressor is in operation.

The defrosting cycle is controlled by the timer clock 115, which acts for a predetermined time period to break the circuit to the circulating fan motor 82 and to close the circuit to the solenoid coil 130 to open the valve 96. During this period, hot refrigerant gas is permitted to flow through the line 112 to the freezer evaporator coil 72 to defrost these coils. At the end of the time period, the switch 126 reverts to its normal position shown in FIGURE 8, reverting the apparatus to its normal operation.

The motor 143 of the compressor 90 is connected by a conductor 144 to the line wire 115. The motor 143 is connected by conductor 145 through the coil 146 of the starting relay 147 and by conductor 148 to the conductor 133 connected through the thermostatic switch 132 to the line wire 116. The conductor 148 includes an overload switch 149 which breaks the motor circuit in the event the motor overheats.

The motor 143 is also connected through the capacitor 150 to the terminals 151 and 152 of the starting relay 147 which are bridged by the relay armature 153. A terminal 152 is connected by a resistor 154 to the conductor 148.

Figure 4:
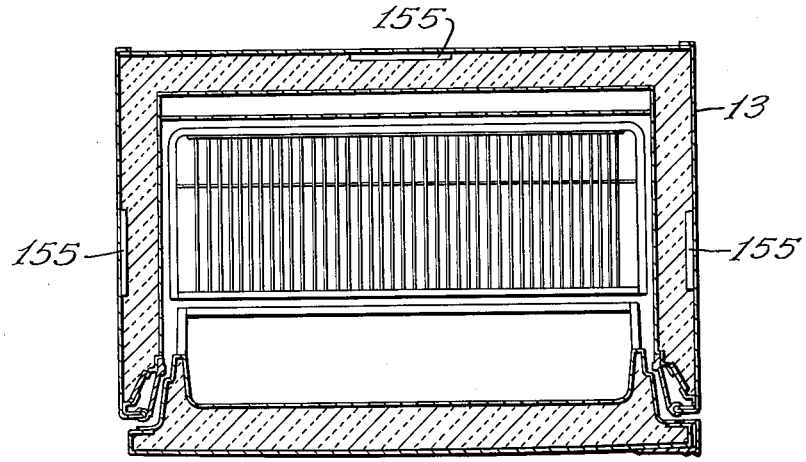
FIGURE 4 is a horizontal sectional view through the freezer section of the refrigerator, the position of the section being indicated by the line 4—4 of FIGURE 1.

The refrigerator also includes a novel feature which may be best described in conjunction with the wiring diagram. In FIGURE 4 of the drawings we have diagrammatically illustrated heating elements 155 which are arranged in heat transfer relation to the outer shell 13 of the refrigerator and freezer cabinet. These heating elements are represented by the resistance 155 connected by conductors 156 and 157 to the line wires 115 and 116 respectively. In actual practice these heating elements 155 are wired so that any or all of the heating elements may be energized. When energized, they act to heat the adjoining panel of the outer refrigerator shell continuously.

In some instances, refrigerators comprise built in units which are built into outside building walls. When thus arranged, one or more of the panels of the refrigerator are oftentimes subject to very low temperatures. If the outside wall of the refrigerator is subjected to a temperature approximately equal to the inside temperature, a condensation problem will arise. Accordingly, when the refrigerators are built into such an outside wall where temperatures of this type may be experienced, the outer shell is heated to maintain the temperature above the temperature of the interior of the freezer.

In the foregoing description a preferred form of construction has been described. FIGURES 1 through 13 of the drawings disclose a modified form of refrigerator B which differs from the refrigerator A only in the cabinet detail. The refrigerant system of both units A and B are identical. The unit B includes a cabinet 159 having an outer covering shell indicated in general by the numeral 160 and incorporating an upper liner 161 and a lower liner 162 which are separated by a partition wall 163. The liners 161 and 162 define a refrigeration compartment 164 and a freezing compartment 165 respectively. These compartments are normally closed by doors 166 and 167 respectively. These doors preferably have hollow inner surfaces and are provided with shelves such as 169 and 170 respectively.

As is best indicated in FIGURE 12 of the drawings, the liner 161 is provided with a rear wall 171 and includes a baffle 172 in parallel spaced relation thereto. An evaporator coil assembly 173 is interposed between the baffle 172 and the liner wall 171 and is provided at its lower end with a deflector plate 174 which deflects moisture into a collecting trough 175 having a drain outlet 176. The outlet 176 permits water draining from the coils during the defrosting operation to pass between the rear end of the rearwardly turned flange 177 at the bottom of the baffle 172 and the rear wall 171 and into a water collection fitting 179 having a drain member 180 which is connected (FIGURE 13) to a tubular connection 181 leading to a water collection pan 182.

As in the previous structure defined, the rear panel 171 is provided with a dome shaped outward projection 183 which is in opposed relation to an aperture 184 in the baffle 172. A fan driven by a fan motor 185 is provided with a fan blade 186 which acts to draw air inwardly and to direct the air downwardly in the space 187 between the baffle 172 and the liner wall 171.

To this point, the structure described is similar to that of the previous construction. The main difference in the construction lies in the fact that the baffle 172 is provided with a second circular opening 189 extending therethrough. A circular frame 190 encircles the opening 189 and is provided with a flange 191 lying in parallel spaced relation to the marginal edge of the baffle 172 encircling the opening 189.

A circular louver frame 192 is provided with a peripheral flange 193 which is rotatably supported between the flange 191 and the marginal edge of the baffle 172. Spaced parallel inclined louvers 194 extend across the circular louver frame 192 and provide openings through which air may flow and guides which act to direct the air in a desired direction.

Angularly spaced projections 195 are provided on the frame 192 by means of which the louver frame may be rotated. As a result, this louver frame may be pivoted so that the louvers within the frame will direct air in any desired direction.

The upper cabinet 164 is otherwise generally similar to the upper compartment of the refrigerator A with the exception of the arrangement of shelves and the elimination of the meat pan incorporated in the refrigerator A. The compartment 164 is provided with a vertical section 198 which includes a forwardly slidable series of vertically spaced shelves 196 supported by a front panel 197 equipped with a handle 199 by means of which the assembled superimposed shelves may be removed or drawn forwardly to remove or replace the contents.

The lower compartment 165 is quite similar to that of the refrigerator A except for the shelf and basket arrangement therein. The lower compartment includes a baffle 200 spaced forwardly of the rear liner wall 201 and includes an evaporator 202 in the space between the baffle 200 and the wall 201. The baffle 200 terminates above the floor of the freezer compartment and a fan driven by a fan motor 203 circulates air from the space between the baffle 200 and the wall 201 across the top of the freezer and over the ice cube trays 204 mounted therein.

The numeral 205 represents a grill or louver forwardly of the fan driven by a fan motor 185 and a suitable grill or louver structure 206 may also extend over the baffle opening forwardly of the fan operated by fan motor 203.

In accordance with the patent statutes, we have described the principles of construction and operation of our two temperature forced air refrigeration systems, and while we have endeavored to set forth the best embodiment thereof, we desire to have it understood that changes may be made within the scope of the following claims without departing from the spirit of our invention.

We claim:

1. A refrigerator including a cabinet having a door opening, a baffle in said cabinet spaced from the interior wall thereof opposite said door opening, an evaporator between said baffle and said wall, said baffle providing an opening near the top of said cabinet, an air circulating means adjoining said opening and operable to circulate air downwardly past said evaporator between said baffle and said wall, the lower edge of said baffle terminating above the bottom of the interior of the cabinet, a tubular shroud of generally rectangular section secured within said cabinet projecting from said one wall at substantially right angles to said one wall, the interior of said shroud communicating with the space between said one wall and said baffle adjacent the bottom of said baffle, the bottom and sides of said shroud extending to said one wall, whereby at least a portion of the air directed downwardly by said air circulating means is deflected through said shroud, and a receptacle of smaller dimensions than said shroud removably supported within said shroud.

2. The structure described in claim 1 and in which the major portions of the sides and bottom of said receptacle are spaced from the sides and bottom of said shroud to provide air passages therebetween.

3. The structure of claim 1 and in which said cabinet includes a top wall, a bottom wall, parallel side walls and a back wall connected in generally right angular relation, said one wall comprising said back wall, and in which said shroud is spaced from said side walls.

4. The structure of claim 1 and including a drip trough beneath said evaporator and adjoining the lower edge of said baffle, a water collection pan, and a drain pipe connecting said drip trough and said collection pan.

5. A refrigerator including a cabinet, a baffle in said cabinet spaced from an interior wall thereof, an evaporator between said baffle and said wall, said baffle providing an opening near the top of said cabinet, an air circulating means adjoining said opening and operable to circulate air downwardly past said evaporator between said baffle and said wall, said baffle having its lower edge terminating above the bottom of the cabinet interior, a drip trough secured adjacent the lower edge of said baffle, a water collection member beneath said cabinet, and a drain extending from said drip trough to said collection member, said baffle having an opening therethrough substantially below the top thereof, and a circular member having spaced louvers providing passages therethrough rotatably supported by said baffle overlying said last named opening.

6. A two temperature refrigerator system for use in a refrigerator having a lower temperature zone and a higher temperature zone, the system including a compressor having an inlet and an outlet, a first refrigerant circuit including in series said outlet, a condenser, a flow restricting device, a lower temperature evaporator in said lower temperature zone, a suction line, and said inlet, a second refrigerant circuit including, in series, said outlet, said condenser, a second flow restricting device, a higher temperature evaporator in said higher temperature zone, said lower temperature evaporator, said suction line, and said inlet, a solenoid valve in both said circuits between said condenser and said first and second flow restricting devices, said solenoid valve normally closing and opening the second circuit, and means sensitive to variations in temperature in said higher zone for actuating said solenoid valve, and a hot refrigerant gas line connecting said outlet and the inlet end of said lower temperature evaporator, and a second solenoid valve selectively connecting said outlet with said first and second circuits and with said gas line and normally closing said hot gas line, and a drip pan beneath said lower temperature evaporator for receiving defrost liquid, said hot gas line extending in heat exchange relation to said drip pan.

7. A refrigerator, comprising: a cabinet having walls defining a storage space; means forming a first passageway adjacent one of said walls having an entrance at one end and an exit at the other end; means for circulating an air stream from said space through said passageway; means for refrigerating said air in said passageway; a shelf extending into said space from adjacent said exit end; means adjacent said shelf for defining a second passageway having an entrance adjacent said first passageway exit for receiving refrigerated air therefrom and an exit spaced from said one wall; means forming an opening in said second passageway means between said second passageway entrance and exit; and means for diverting a portion of air from said second passageway through said opening.

8. A refrigerator, comprising: a cabinet having walls defining a storage space; means forming a first passageway adjacent one of said walls having an entrance at one end and an exit at the other end; means for circulating an air stream from said space through said passageway; means for refrigerating said air in said passageway; a shelf extending into said space from adjacent said exit end; means adjacent said shelf for defining a second passageway having an entrance adjacent said first passageway exit for receiving refrigerated air therefrom and an exit spaced from said one wall; means associated with said second passageway means for supporting articles while being chilled by said second passageway air; means forming an opening in said second passageway means between said second passageway entrance and exit; and means for diverting a portion of air from said second passageway through said opening.

9. Refrigerator apparatus, comprising: means forming a refrigerant flow series including a compressor having an inlet and an outlet, then a condenser communicating with said outlet, then a flow restrictor, then an evaporator having an inlet and an outlet and then a suction return line from said evaporator outlet to said compressor inlet; a hot gas line extending from said compressor outlet to said evaporator inlet; an electrically operable valve in said hot gas line normally closing the same; a compressor motor operably connected to said compressor for operating the same; an electrical circuit to said compressor motor including a power source and a thermostatic switch closing said circuit at a predetermined upper temperature and opening said circuit at a predetermined lower temperature; a timer circuit including a power source, said electrically operable valve and a normally open timer switch; a timer motor for periodically closing said timer switch to energize and open said electrically operable valve for passing hot gas through said hot gas line to said evaporator and defrost the same; an electrical circuit for said timer motor including a power source and said thermostatic switch, said timer motor circuit thereby being opened and closed by operation of said thermostatic switch that also controls the operation of said compressor motor; an air circulation fan motor; an electrical circuit therefor including a power source and a normally closed timer second switch; and means for opening said timer second switch when said normally open timer switch is closed.

10. Refrigerator apparatus, comprising: means forming a refrigerant flow series including a compressor having an inlet and an outlet, then a condenser communicating with said outlet, then a flow restrictor, then an evaporator having an inlet and an outlet and then a suction return line from said evaporator outlet to said compressor inlet; electrically operated defrost means for defrosting said evaporator; a compressor motor operably connected to said compressor for operating the same; an electrical circuit to said compressor motor including a power source and a thermostatic switch closing said circuit at a predetermined upper temperature and opening said circuit at a predetermined lower temperature; a timer first circuit including a power source, said electrically operated defrost means and a normally open timer first switch; a timer motor for periodically closing said timer first switch to operate said defrost means; an air circulation fan motor; an electrical circuit therefor including a power source and a normally closed timer second switch; and means for opening said timer second switch when said timer first switch is closed.

11. Refrigerator apparatus comprising: wall means defining a conduit having an inlet and an outlet spaced substantially from said inlet; means for flowing a stream of refrigerated air through said conduit from said inlet to said outlet; a container having an access opening and at least one portion removably disposed in said conduit intermediate said inlet and outlet; and means comprising a portion of said conduit wall means closing said access opening when said container portion is so disposed in said conduit whereby the interior of the container is refrigerated by said stream wiping the exterior thereof in flowing through said conduit.

12. Refrigerator apparatus comprising: wall means defining a conduit having an inlet and an outlet spaced substantially from said inlet; means for flowing a stream of refrigerated air through said conduit from said inlet to said outlet; a container having an access opening; means for removably suspending said container in said conduit intermediate said inlet and outlet; and means comprising a portion of said conduit wall means closing said access opening when said container portion is so suspended in said conduit whereby the interior of the container is refrigerated by said stream wiping the exterior thereof in flowing through said conduit.

13. Refrigerator apparatus comprising: wall means defining a conduit having an inlet and an outlet spaced substantially from said inlet; means for flowing a stream of refrigerated air through said conduit from said inlet to said outlet; a container having an access opening and at least one portion removably disposed in said conduit intermediate said inlet and outlet; means comprising a portion of said conduit wall means closing said access opening when said container portion is so disposed in said conduit whereby the interior of the container is refrigerated by said stream wiping the exterior thereof in flowing through said conduit; a cabinet in which said conduit is located and having an interior into which said outlet empties; and means for diverting a portion only of said refrigerated air stream in said conduit prior to said outlet into said cabinet interior.

References Cited in the file of this patent

UNITED STATES PATENTS 2,167,442    Alsing _____ July 25, 1939

(Other references on following page)

UNITED STATES PATENTS

| | | |
|---|---|---|
| 2,382,084 | Mathews | Aug. 14, 1945 |
| 2,404,851 | Knowles | July 30, 1946 |
| 2,492,611 | Zearfoss | Dec. 27, 1949 |
| 2,532,816 | Kurtz | Dec. 5, 1950 |
| 2,598,917 | Ingram | June 3, 1952 |
| 2,687,020 | Staebler | Aug. 24, 1954 |
| 2,688,850 | White | Sept. 14, 1954 |
| 2,707,871 | Mocey | May 10, 1955 |
| 2,794,325 | Shearer | June 4, 1957 |
| 2,805,555 | Schumacher | Sept. 10, 1957 |
| 2,807,942 | Dahlgren | Oct. 1, 1957 |
| 2,888,808 | Jacobs | June 2, 1959 |
| 2,912,834 | Mann | Nov. 17, 1959 |